United States Patent

[11] 3,581,046

| [72] | Inventor | Charles E. Letsche |
| | | 505 Garwood, Prospect Heights, Ill. 60056 |
| [21] | Appl. No. | 808,711 |
| [22] | Filed | Oct. 28, 1968 |
| [45] | Patented | May 25, 1971 |

[54] PRESSURE CONTROL FOR TUBE MILL
6 Claims, 11 Drawing Figs.

[52] U.S. Cl. .................................................. 219/82, 219/59
[51] Int. Cl. .................................................. B23k 11/06, B23k 31/06
[50] Field of Search ............................................. 219/81, 82, 84, 83, 89, 59; 92/100

[56] References Cited
UNITED STATES PATENTS

| Re25,300 | 12/1962 | Latour et al. | 219/59 |
| 1,478,262 | 12/1923 | Snodgrass et al. | 219/84X |
| 2,237,551 | 4/1941 | Darner | 219/59 |
| 2,582,963 | 1/1952 | Cachat | 219/9.5X |
| 2,833,219 | 5/1958 | Lewis | 92/100X |
| 2,974,640 | 3/1961 | Lindbom et al. | 92/100X |

*Primary Examiner*—J. V. Truhe
*Assistant Examiner*—Hugh D. Jaeger
*Attorneys*—A Yates Dowell and A. Yates Dowell, Jr.

ABSTRACT: An improved tube mill generally employed in the production of steel tubing by the continuous electric resistance welding of an axially extending seam cleft in a cylindrical tube length formed from a continuous length of metal strips, and directly responsive fluid pressure means to maintain a constant pressure relationship between the welding element and the support means for said tubes to produce uniform welds in said tubing.

INVENTOR.
Charles E. Letsche

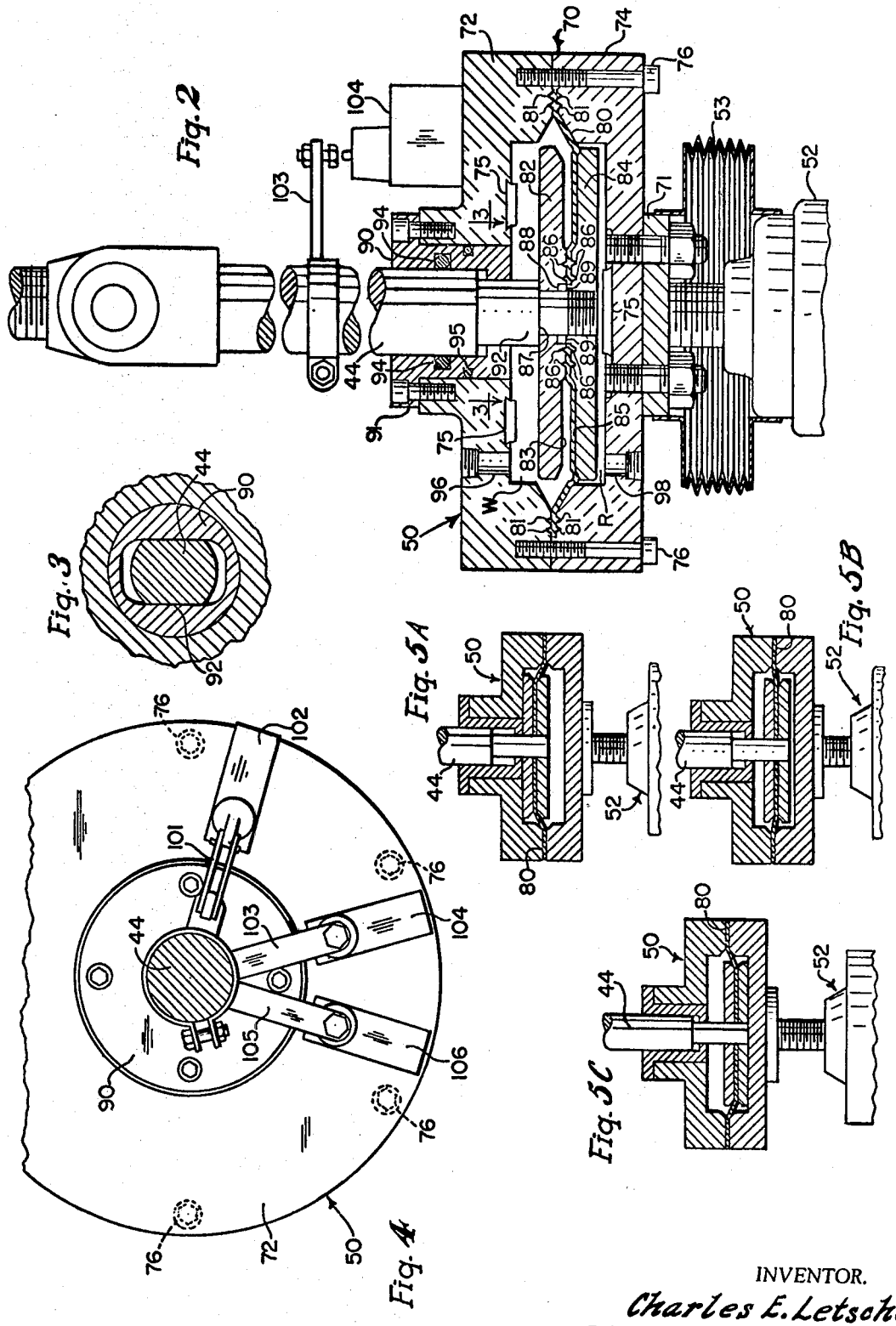

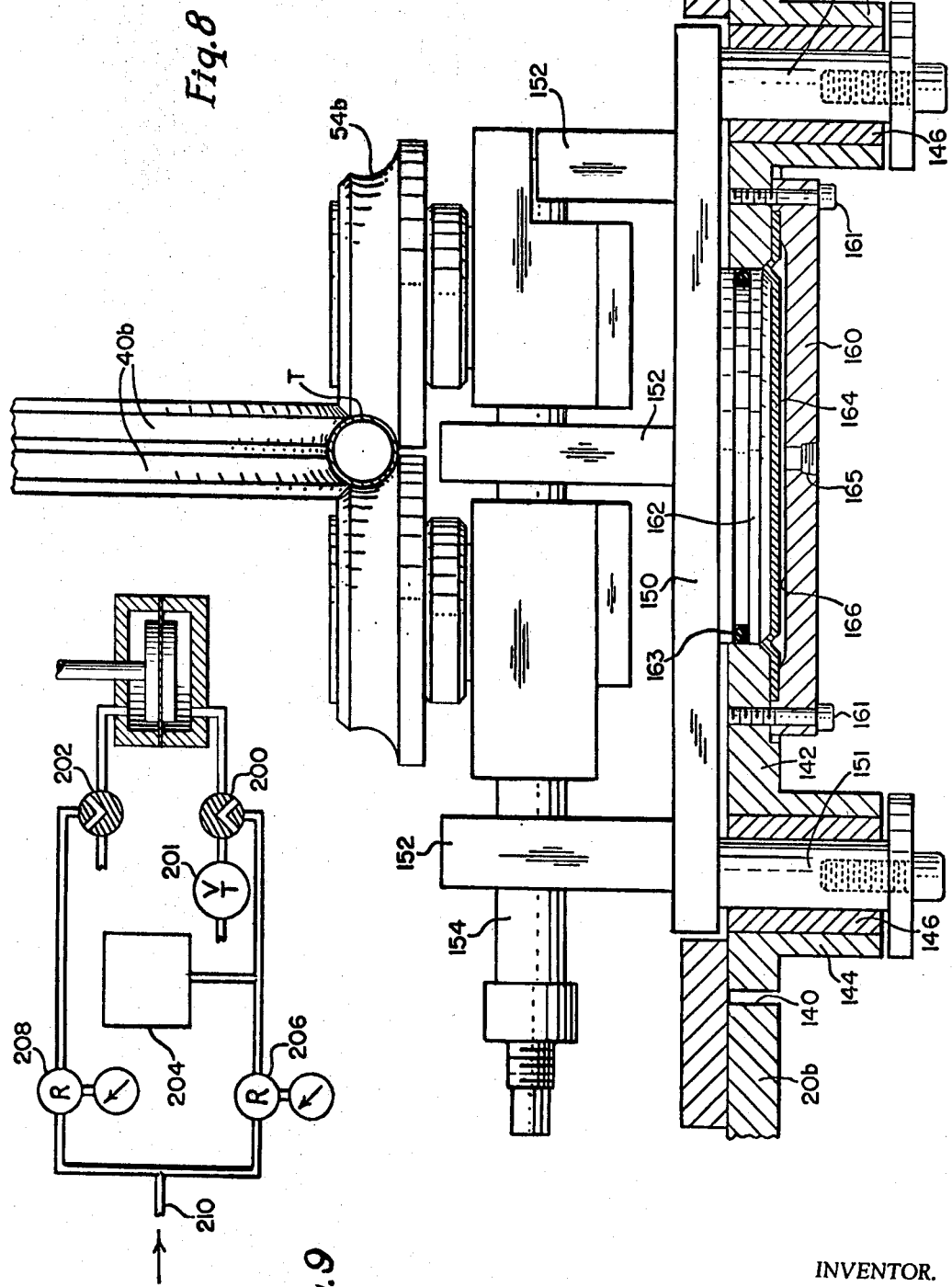

PRESSURE CONTROL FOR TUBE MILL

In the art of butt welding tubing in a continuous manner it has been common practice to move a continuous length of metal strip through a series of forming rolls in the direction of a welding station in such a fashion that the strip when it reaches the welding station has been generally formed into a cylindrical shape having an axially extending seam. At the welding station a pair of large dielectrically separated rotary electrode wheels contact the strip on opposite sides of the seam and a current is imposed through the wheels and is caused to flow across the seam so that the edges are heated to the proper welding temperature. This temperature can be controlled by well-known power regulating equipment which regulates the amount of recordable electrical energy supplied to said wheels. While at the welding station the edges of the cylindrical tube lengths are continuously forced together by additional rolls under pressure to fuse the seam together. This provides a continuous length of tubing having a strong and unbroken welded seam.

It can be appreciated by those skilled in the welding art that there are a plurality of variables which control the quality of the welds obtained in an electric resistance welder. Nominally, these variables primarily relate to the welding temperature and the pressures applied to the workpieces during welding as well as the spacing and relative positioning of the two workpieces during the period of time that the weld is taking place. In tube mills the temperature can be accurately controlled, as mentioned hereinabove, by power regulating mechanisms while the adjustment of the workpiece relating to the spacing of the edges of the seam can be accurately controlled by the positioning of the rolls in the forming stations as well as at the welding station. While complex mechanisms have been suggested in the past for the control of pressure at the welding station it has been heretofore impossible to automatically and instantaneously control the welding pressure exerted by rotary electrode wheels at a continuous tube mill welding station.

It is the primary object of this invention to provide an improved tube mill having means to automatically and substantially instantaneously compensate for tolerance variations in a workpiece and electrode wheel wear occuring during a continuous run, and to maintain a substantially constant welding pressure by the electrode wheels on the edges of the continuous tubes being welded in such a mill.

It is the intent of the present invention to provide a double acting fluid pressure means, preferably air pressure, which will not only support the massive weight of the rotary electrode wheels and the rotary transformer associated therewith in a semifloating condition but also through the same pressure means maintain a substantially constant pressure, in the opposite direction to the support pressure, which is directly responsive to tolerance variations in the workpiece passing through the electrode station, and electrode wheel wear during a continuous tube run.

Another object of the invention is to provide suitable indicating means so that an operator can at all times be apprised of the exact position of the electrode wheels during set up, operation and break down periods in the running of a tube mill.

A further object is to provide pressure indicia means which will permit an operator to evaluate the results of a given pressure and to enable him to reset the machine to a predetermined condition for later tube runs.

Further objects will be apparent to those skilled in the art upon the reading of the following specification and accompanying drawing wherein there is described and shown illustrated embodiments of the present invention.

In the drawing:

FIG. 2 is a cross-sectional view in elevation of a preferred embodiment of the pressure responsive control means of the type shown in FIG. 1;

FIG. 3 is a partial view in cross section taken along line 3-3 in FIG. 2;

FIG. 4 is a plan view in partial section of the device shown in FIG. 2;

Figure 6:
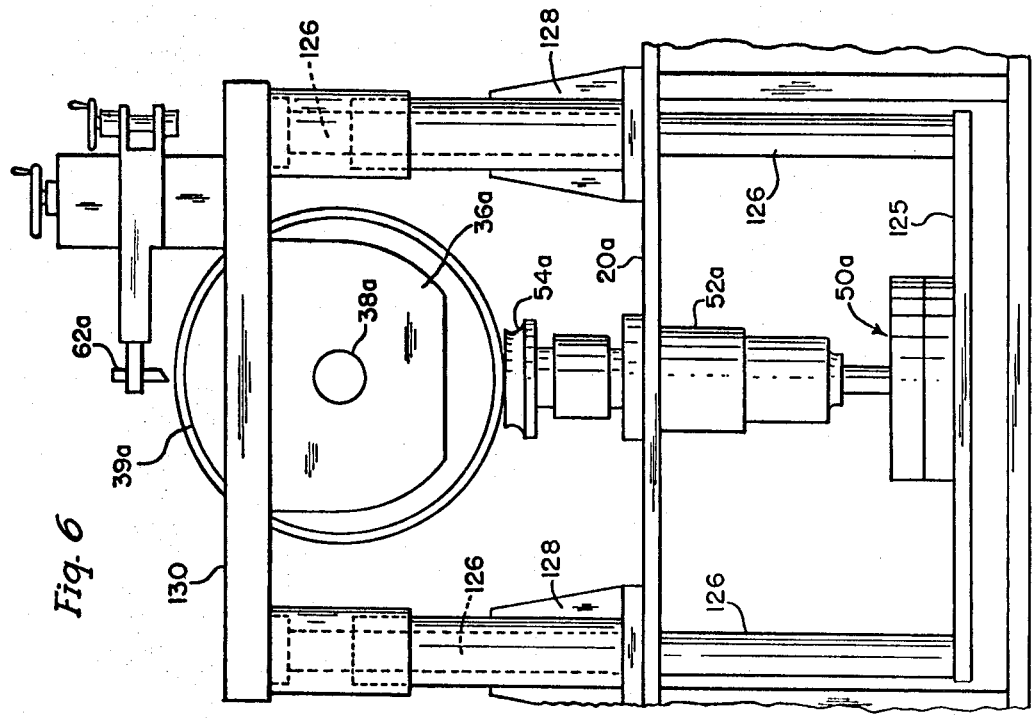
Figure 7:
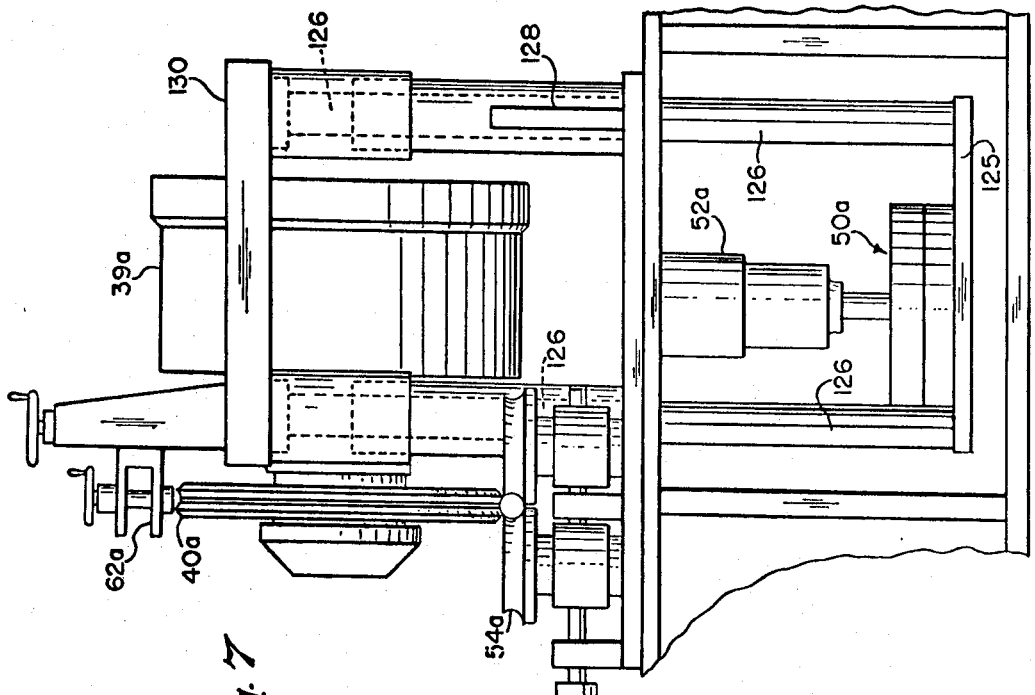

FIGS. 5a, 5b, and 5c are schematic sectional view of the device shown in FIG. 2 in its various operative and inoperative positions;

FIG. 6 is an elevational view and partial section showing a second embodiment or form of tube mill including and utilizing the teachings of the present invention;

FIG. 7 is an elevational view and partial section of the device shown in FIG. 6 as taken along line 7-7;

FIG. 8 is an elevational view and partial section of another embodiment of the present invention wherein the fluid pressure means is applied to the pressure roll system as opposed to the previously shown application to the electrode wheel portion of the system; and FIG. 9 is a schematic diagram of the entire pressure system for operation of the present invention.

Referring now to the drawings wherein similar parts are referred to by similar numerals and particularly to FIGS. 1—5, a tube mill of the type contemplated generally includes a base means 20 supporting a welding electrode assembly 22. The base means 20 is positioned in complementary adjoining fashion to the end of the roll forming line 24 on the upstream side of the material path of travel and to a cooling section-sizing section and appropriate cutoff mechanism 26, as is well known in the art, on the down stream side of the direction of tube travel.

Figure 1:
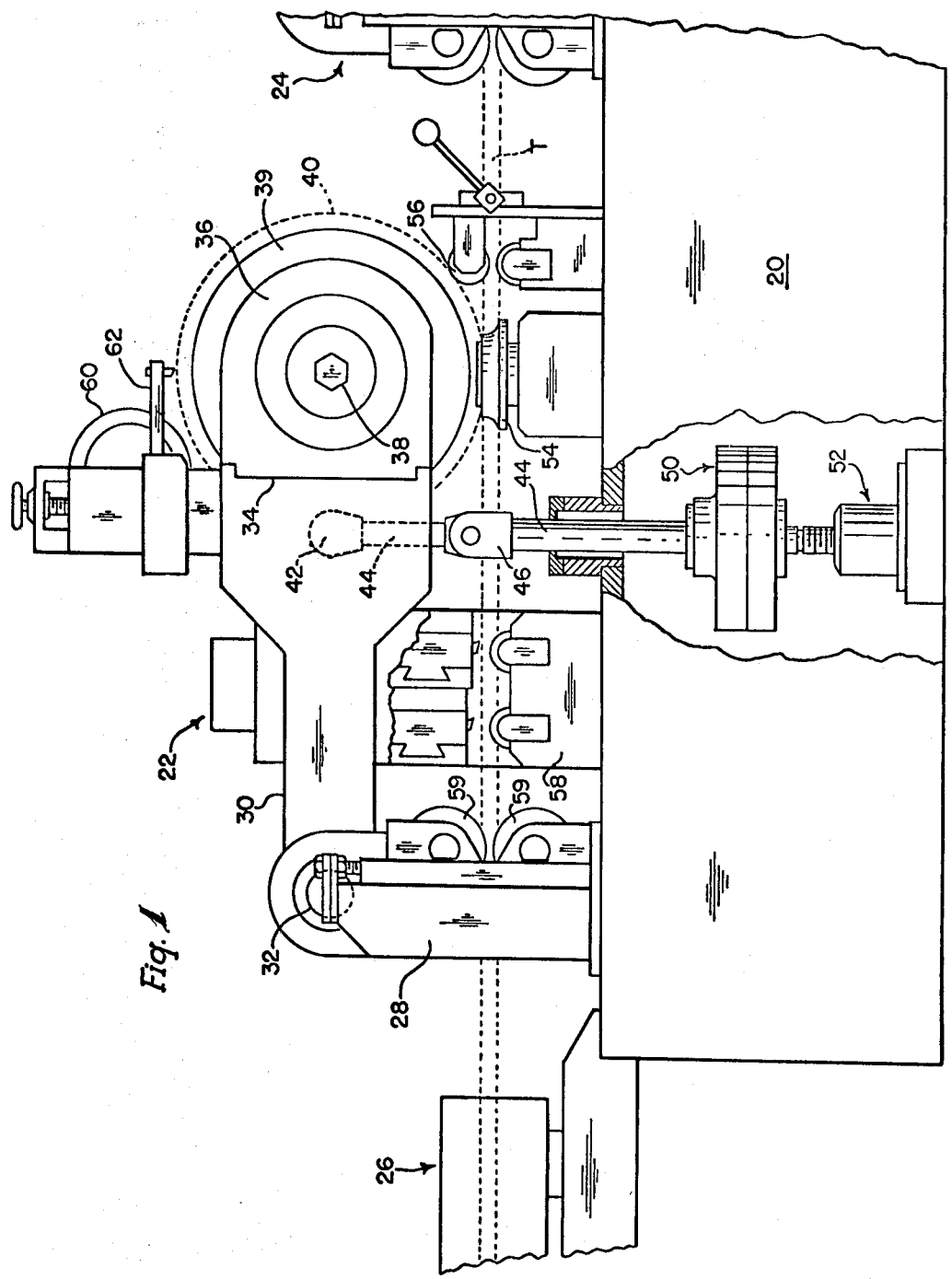
FIG. 1 is an elevational view of a tube mill and pressure responsive means constructed in accordance with the teachings of the present invention.

The welding unit includes, in the present embodiment, as is well known in the art, a trunnion mounting means 28 extending upwardly from the base 20 and having a pair of arms 30 rotatively supported in spaced relation on the trunnion bearings 32, only the forward arm 30 being visible in FIG. 1. The arms 30 extend horizontally laterally away from the point of rotation and are provided with a connecting portion 34 at their free extremity, with portion 34 disposed generally parallel and horizontal with the base 20. Portion 34 is generally platelike and provided with a pair of flanges 36 which are spaced apart, one not being seen in the drawing, for providing bearing means 38 to support opposite extremities of the rotary transformer 39, its associated driving means and the electrode wheel 40 shown in phantom. In the present embodiment the electrode wheels are shown in dotted lines to permit a more thorough understanding of the structure involved in the embodiment. On the horizontal centerline between trunnion bearing 32 and bearing 38, visible in FIG. 1, there is provided joint 42 adapted to accept a vertically extending arm or crank 44 which traverses the base 20 and is supported at its opposite end by the directly responsive fluid pressure means 50. The arm 44 is preferably provided with a joint 46 of a universal nature intermediate its length, for purposes best set forth hereinafter. Below the fluid pressure means 50 there is provided base support and movement means 52 which will be described more fully.

As can be appreciated by those skilled in the art, the base 20 will also include a pair of forming rollers 54 positioned immediately below the centerline of the electrode wheels to provide the base and lateral support to the tubular formed strip material which is being welded. Upstream there is generally provided a seam guide 56 to accurately locate the seam of the formed tubing as it approaches the electrode wheels and a scarfer 58 on the downstream side of the direction of travel for purposes of sciving or cutting the excess flash from the welded seam while it is still in a reasonably hot condition and then followed by a pair of opposed rollers 59 which form a final shaping or flash ironing stand. Similarly, a drive motor 60 can be mounted on arm 30 for purposes of rotating the electrode wheels during the dressing operation normally carried out by the dressing tools 62 between runs of tubing, whereby the specific radius and configuration desired on the electrode wheels is reimposed. Each of these latter devices are well known in the art and further detail is thought to be unnecessary.

During the operation of the device the tubing "T" shown in phantom for purposes of illustration, is fed in from the forming rolls 24 into the seam guide 56 and thence to the supporting rollers 54 at the welding station. During the setup of the machine the support and movement means 52, which is commonly a jack type of mechanical movement capable of large variations in axial displacement, positions the electrode wheels generally in the position desired relative to the supporting rollers 54. At this point the fluid pressure means 50 is brought into operation. Its construction and configuration as well as its operation can be best seen in FIGS. 2—5. In the preferred embodiment the device includes a hollow housing 70 made up of two recessed plates 72 and 74 which are suitably joined about their periphery by cap screws 76.

The mating configuration of the opposing peripheral surfaces of upper and lower portions 72 and 74 are adapted to receive a diaphragm 80. Diaphragm 80 is provided with at least one or more annular laterally extending rings 81 which are captured in sealing relation between complementary cavities in portions 72—74. The diaphragm 80 is apertured in its center and has additional annular laterally extending rings 86 surrounding the aperture. A pair of plates 82—84, having relieved opposed faces 83—85 respectively, are centrally apertured and adapted to capture and support in sealing relation the central portion of diaphragm 80. Plate 84 is provided with a threaded central aperture adapted to accept the threaded end of arm 44, while plate 82 is provided with a through bore recessed at its inner end to accept an unthreaded reduced portion of arm 44 and bear against a shoulder 87 created by the reduction of the end of arm 44. An annular sealing means 88, such as a neoprene O-ring is provided in the recess adjoining the bore and adapted to bear against the arm 44, plate 82 and an axially extending neck 89 extending upwardly from plate 84 through the aperture in diaphragm 80. With the above indicated configuration, two variable volume chambers "R" and "W" are created within the hollow housing 70. The recesses in plates 82—84 permit a free movement of the diaphragm between predetermined limits, namely, contact by plate 82 with the upper portion 72 and plate 84 at the opposite extremity with lower portion 74. A resilient pad means 75 is located in both the upper and lower portions 72—74 to cushion the contacting between the plates and portions.

Referring now to upper portion 72, as best seen in FIGS. 2 and 3, it is centrally apertured and provided with a continuous annular flange adapted to accept a bushing 90 within said aperture. Bushing 90 is provided with a laterally extending flange 91 which is seated atop said annular flange and secured thereto by suitable means such as cap screws. Bushing 90 is radially relieved intermediate its length on both its inner bore and its outer surface to provide means for acceptance of pressure seal means 94—95 respectively for sealingly engaging arm 44 and the wall of the aperture bore in upper portion 72 respectively. The lower inner bore of bushing 90 is restricted to form an opening having two flat sides for engagement with a complementary axial section 92 on arm 44. Other means for prevention of rotation between arm 44 and housing 70 can be equally well utilized.

Opening into chambers "W" and "R" are ports 96—98 respectively, which connect to a suitable source of air pressure, as will be described hereinafter.

It will be appreciated that movement of the diaphragm under air pressure is limited in extent and hence there is provided an extended movement means 52 which may take the configuration of either a fluid pressure or mechanical jack. Jack 52 utilizes an upper plate 71 suitably secured to the lower portion 74, as by double ended studs and nuts, as shown. A bellows type boot 53 is preferably secured to plate 71 and means 52 to protect the jackscrew or ram from external contaminants. Thus, the operator can accomplish gross movements through use of the jack 52 and fine adjustments through control of the diaphragm 80.

As can be best seen in FIG. 4, a plurality of limit switch means 102, 104 and 106 are circumferentially positioned atop upper portion 72. Suitable bracket means 101, 103 and 105, extend radially from and are adjustably clamped to arm 44 to contact with switches 102, 104 and 106 respectively. Movement of the arm 44 as controlled by diaphragm 80 will result in actuation of one or more of these switches to control indicia means so that the operator can at all times ascertain the position of the diaphragm. With the bracket means being adjustable the operator can position them to indicate the optimum operating conditions, as determined through operating experience.

Referring now to FIG. 9, the housing 70 with its diaphragm 80 forming two chambers "W" and "R" are preferably pneumatically connected to an air supply 210 with intermediate control means. On the "W" or weld side chamber the port 96 there is interposed a three way valve 202 and an adjustable pressure regulator 208 having gauge means related thereto between the port 96 and the air supply 210. On the "R" or retract side chamber the port 98 is preferably connected successively to a three way valve 200 having an additional control means 201 for controlling the speed of exhausting air in the chamber "R," an intermediate air tank 204 to handle surging and a pressure regulator and gauge combination 206 before connection to air supply 210.

In the operation of the welding machine it is necessary to adjust the jack means 52 until the electrode wheels are approximately in the position desired for contact with the tubing "T." The operator then adjusts the regulator 206 until the air pressure in chamber "R" is just enough to lift the weld unit and overcome any friction that might be involved in the trunnion bearings or in the arm joints. Normally approximately 15 p.s.i. will accomplish the raising of the welding unit into a free floating condition or up in the wheel dressing position. The three way valve 202 is normally open to exhaust and remains in that position during this initial charging of the "R" chamber, with the three way valve 200 being in line with the regulated air supply. Valve 200 is retained in the energized position and the "W" three way valve 202 is energized from a zero pressure to an adjusted position to establish the required weld pressure by moving the diaphragm downwardly drawing on the arm 44 and the connected weld electrode assembly 22, resulting in a controlled pressure being exerted by the electrode wheels 40 on the tubing. In the event that the tubing "T" should have tolerance variations in diameter the constant air pressure combined with the double chamber and its surge tank buffer will result in a constant pressure by the electrode wheels on the workpiece.

Referring now to FIGS. 5A, 5B and 5C, it has been determined through operation of such a machine as is disclosed herein that when the diaphragm 80 and its associated plates are in the uppermost position shown in FIG. 5A that limit switch 102 can be actuated to operate a green indicia light at the control panel to indicate that the diaphragm is in the retract position and the operator can then adjust the jack means 52 for rough positioning. When the pressure to the "W" is balanced with the pressure to the "R" chamber and the diaphragm is centrally located as seen in 5B then limit switch 106 is actuated and the operator observes a blue light at the control panel and knows that the machine is in welding position and pressure. Lastly, when the diaphragm is in the position shown in FIG. 5C, the "R" chamber is evacuated and the diaphragm and the welding assembly are in the bottom or down position limit switch 104 is actuated and normally a red light is lighted on the control panel to warn the operator that the electrode wheels are down and can be damaged if tubing is jogged into the welding unit. While certain indicia means are mentioned for illustration purposes it should be clear that other control and switch means can be readily substituted.

Referring now to FIGS. 6 and 7, it can be seen that the principals applicable to the first embodiment having a pivoted welding assembly can be applied to another form of welding unit, namely, one utilizing a columnar approach wherein similar numerals will be applied to similar parts with the addition of the suffix "a." In this device a base 20a is provided with a plurality of sleeve bearings 128 which are adapted to support and stabilize a similar number of columns 126 which are freely movable in a vertical direction within the sleeves. At the base of the columns 126 is semifloating platelike member 125 with the are fixedly positioned relative to one another. At their opposite end a second platelike member 130 secures the columns together as a unit. Affixed to and suspended from upper platelike member 130 are flange means 36a for supporting the bearing means 38a in which is mounted the rotary transformer 39a. Also appurtenant to the upper member 130 is the wheel dressing means 62a. Suspended from base 20l, rather than being supported from the bottom as was the case in the initial embodiment, is jack means 52a and secured thereto is fluid pressure means 50a which in turn is connected to and supports lower platelike member 125 in movable relation to the base means 20a. The operation of this device is substantially similar to that of the other embodiment relative to the adjustment of the assembly for the welding operation and maintenance of a substantially constant pressure during welding regardless of tube tolerance variations as well as wheel wear during a long tube run.

A further embodiment to the present invention can be seen in FIG. 8, wherein similar parts are identified by similar numerals with the addition of the suffix "b." While the two previous embodiments have been concerned with the provision of a pressure adjustment and balance of frictional elements within the welding assembly per se, this embodiment is concerned primarily with a stable welding assembly which is adjustably fixed in position and a variable pressure inducing means related to the pressure roll system which supports the tube below the electrode wheels.

The base 20b is provided with a recess 140 adapted to accept a plate 142 having depending members 144 integral therewith. Members 144 are bored out to provide means for acceptance of a sleeve bearing 146. A plate 150 overlies plate 142 and is provided with downwardly extending posts 151 which are accepted within the sleeve bearings 146 to permit free vertical movement of plate 150. Extending upwardly from plate 150 are a plurality of support means 152 for supporting the pressure rolls 54b through which the tubing "T" is transported and supported during the welding operation. Adjustment means 154 of a known variety is provided to move the rolls 54b apart relative to the centerline of travel of the tubing "T," as is well known in the art.

Positioned centrally of plate 150 is a pistonlike member 162 having an annularly relieved portion intermediate its axial extent for acceptance of a sealing member, such as O-ring 163. The plate 142 is complementarily bored out to accept the member 162 and the O-ring 163. A recessed member 160 having a central cavity 166 is attached to plate 142 by screws 161 to form a closed chamber. To insure the hermetic nature of the device a diaphragm 164 is sealingly clamped between member 160 and plate 142 and extends over the complete surface of member 164 and bears against same. A port 165 is provided by means of a through bore in member 160 to provide egress to the chamber for introduction of an air pressure from a suitable supply.

In the operation of this device the electrode wheels 40b are positioned in contact with the workpiece or tubing "T" and the desired welding pressure is induced by the introduction of air pressure to the chamber through port 165 with the resultant movement of diaphragm 164 and member 162 to impart pressure of rolls 54b against the tubing "T" and welding electrode wheels 40b. The constant pressure of air can be regulated in the previously described fashion set forth hereinabove for the other embodiment, as for example, with pressure regulators and surge tank.

While other examples will be apparent to those skilled in the art it is my intent that I be limited only the the appended claims.

I claim:

1. In a tube welding machine having a base, means for supporting a workpiece on said base, and means for welding the workpiece into a tubular form, the improvement comprising a directly responsive double acting fluid pressure means to maintain a constant pressure relationship between the support means and the weld means relative to the workpiece, said fluid pressure means including a fixed housing, a diaphragm disposed within said housing and separating said housing into multiple chambers, means connecting said diaphragm to said welding means, means for introducing fluid under pressure into one of said chambers to apply a support force to said welding means, and means for introducing fluid under pressure into the other of said chambers to apply a controlled force to said welding means in overriding opposition to said support force.

2. The structure of claim 1, in which said welding means is mounted on a frame swingably mounted on said base, and said means for connecting said diaphragm to said welding means is connected to said frame intermediate the welding means and said swingable connection.

3. The structure of claim 1 in which said means for introducing fluid under pressure into one of said chambers includes regulator means for introducing a constant pressure into said one chamber, and surge means to balance the pressures within said chambers so that a substantially constant pressure is maintained on said workpiece.

4. The structure of claim 3 in which the means for introducing fluid under pressure into the other of said chambers includes regulator means for introducing a constant pressure into said other chamber than was supplied to said one chamber to cause said welding means to engage said workpiece under a constant pressure.

5. The structure of claim 1 including indicator means for indicating the position of the diaphragm within said housing.

6. The structure of claim 1 including means for adjusting the position of said housing and for maintaining said housing in fixed adjusted position.